Dec. 29, 1936.   C. E. REED   2,065,742
ROLLER CUTTER SPINDLE AND BEARING ASSEMBLY FOR EARTH BORING DRILLS
Filed March 26, 1935
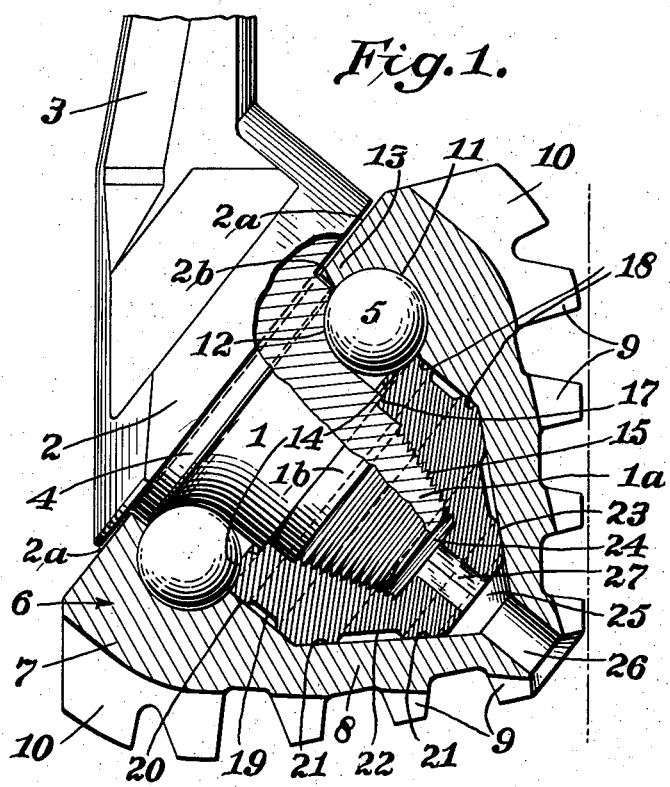
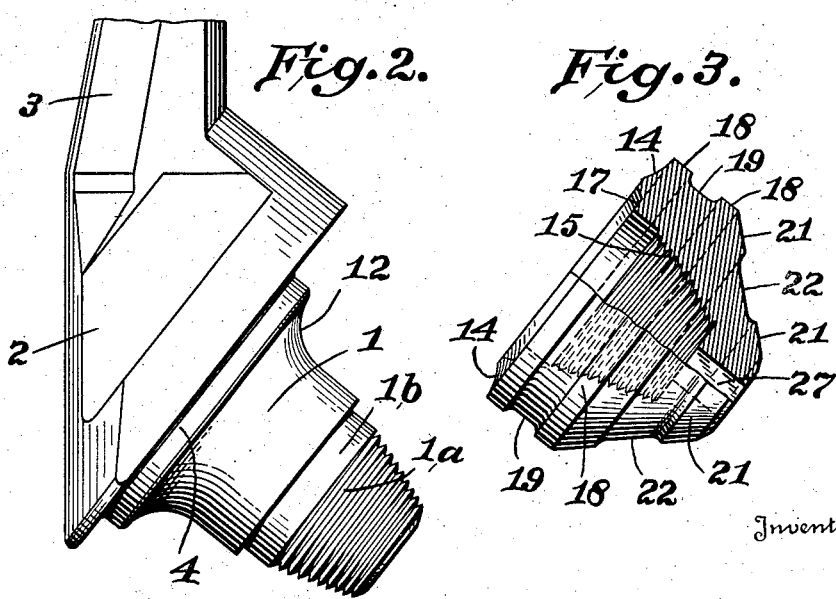
Inventor:
Clarence E. Reed, Patented Dec. 29, 1936

2,065,742

UNITED STATES PATENT OFFICE 2,065,742

ROLLER CUTTER, SPINDLE, AND BEARING ASSEMBLY FOR EARTH BORING DRILLS

Clarence E. Reed, Wichita, Kans., assignor to Chicago Pneumatic Tool Company, New York, N. Y., a corporation of New Jersey Application March 26, 1935, Serial No. 13,145

7 Claims. (Cl. 255—71)

The invention concerns a roller toothed cutter, spindle, and bearing assembly for earth boring drills, and it consists in the features and combination and arrangement of parts hereinafter described and particularly pointed out in the claims.

In the accompanying drawing

Figure 1 is a part sectional view and part side elevation of the invention.

Fig. 2 is a side view of the main spindle section and the spindle support.

Fig. 3 is a view of the terminal spindle section partly in section.

In the drawing 1 indicates the main spindle portion which is integrally connected with its support, which latter consists of a body 2 and a shank or stem 3, which extends upwardly from the body portion to be seated in the head of the drill, which also receives the body portion of the support. The support is provided with an annular portion 4 of reduced diameter located between the main spindle portion 1 and the said body portion of the support. This annular projection is of reduced diameter in respect to the body portion. It is an integral part of said body and at the junction between it and the integral main portion of the spindle there is a raceway portion for ball bearings 5. These are of comparatively large diameter and the raceway is curved in section through the axis of the spindle to conform to the curve of the ball so that the ball finds an annular raceway suitably curved to make contact with the curved surface of the ball, said raceway therefore being partly on the spindle and partly on the support, integrally attached to the spindle portion.

The roller cutter 6 is of generally frusto-conical form having a base zone 7 and a frusto-conical portion 8 integrally conected therewith, each of said portions of the cutter having teeth thereon, the teeth of the frusto-conical portion being in annular rows widely separated from each other, as shown at 9, and the teeth 10 of the base portion of the cutter extending with their cutting edges in radial planes in respect to the axis of the cutter assembly. The base portion of the cutter is provided with a raceway portion 11 complementary to the raceway portion 12 at the junction of the main portion of the spindle and the spindle support, and the cutter has an inwardly extending flange 13 partly embracing the balls 5 and located between said balls and the spindle support, serving, in part, to hold the roller cutter against displacement inwardly towards the vertical axis of the drill. Coacting with this flange in this function of rotatively locking the cutter on the spindle is the terminal portion of the spindle shown in detail in Fig. 3 and provided with an annular bearing upon which the balls will roll, this being indicated at 14.

This terminal member is fixed to the main member of the spindle by a screw threaded connection 15, this screw thread being formed on a tapered extension 1a of the spindle between which and the main portion of the spindle there is an annular surface 1b, this surface being on a cylindrical reduced extension of the main spindle portion, leaving a shoulder at 17 against which the end of the terminal spindle portion abuts. This terminal spindle portion has an annular surface within its base portion complemental to and contacting with the annular reduced diameter extension 1b of the main spindle portion 1. The exterior of the terminal spindle portion has a zone 18 which is cylindrical and is provided with a groove 19 to reduce the area of the frictional surface which surface contacts with the cylindrical bore 20 of the roller cutter. The terminal section also has a frusto-conical zone 21 provided with a groove 22 to reduce its frictional area, and this frusto-conical zone has frictional contact with the wall of the conical bore 23 within the apex portion of the roller cutter, the taper of this conical portion being in conformity with the taper of the exterior toothed surface of the frusto-conical portion of the cutter.

Clearance is provided at 24 between the inner end of the main portion of the spindle and the interior wall of the bore of the terminal portion of the spindle, and clearance is also provided between the inner free end of the spindle assembly and the wall of the bore of the cutter nearest its apex, this clearance being shown at 25. The roller cutter is provided with a small bore 26 at its apex and the terminal section of the spindle is provided with a wrench socket rectangular in cross section indicated at 27 at its apex end.

In assembling the parts the terminal spindle portion, Fig. 3, would be placed in its position within the apex bore of the roller cutter, then the large diameter balls are inserted into the raceway portion of the roller cutter, next the main spindle section and the roller cutter with its contained terminal spindle section are brought together. A suitable wrench introduced through the opening or bore at the apex of the cutter and into the wrench receiving socket 27 of the terminal section of the spindle is then used to enable the said terminal portion to be turned in relation to the main portion of the spindle, and the screw threaded parts are seated one within the other and the raceway surface 14 of the large diameter terminal spindle portion is thus brought into position to complete the raceway for the large diameter balls and at the same time the roller cutter is located in prescribed relation to its support, and with the annular integral portion 4 of the spindle and spindle body within the bore at the base of the cutter.

The structure can be handled as one body in placing it into or removing it from the bit head.

The assembly is particularly adapted for small diameter drilling bit organizations.

The large balls perform a plurality of functions. They take radial loads, end thrust of the cutter and lock the cutter rotatively on the spindle. The latter effect is rendered possible by the flange 13 of the base portion of the cutter contacting the large balls on one side and the spindle portion 14 contacting the balls substantialy at the opposite side thereof towards the free end of the spindle.

The tapered frictional surface on the end of the spindle takes some of the end thrust of the cutter, and limits the degree of thrust imposed on the balls, and progressively sustains end thrust as the balls reduce in diameter in service. Initially there is clearance at 2a between the base face of the cutter and the spindle support 2, and there is also clearance at 2b between the cylindrical bore of the cutter at its base and the cylindrical periphery of the reduced diameter annular portion 4 of the spindle support. When the balls reduce in diameter in service accompanied by wear on the frictional surfaces between the free end portion or terminal section of the spindle and the complementary surfaces within the cutter, the opposing surfaces at said clearances 2a and 2b at the base of the cutter will engage each other and sustain the thrusts thereby maintaining the cutter in efficient service for a longer period of time, it being noted that the surfaces defining the clearance 2a are at an angle, a right angle, to the surfaces defining the clearance 2b. Likewise, the cylindrical periphery of the terminal portion of the spindle and the complementary annular bearing surface of the cutter are at an angle to the friction surfaces at the conical portion of the terminal section of the spindle and the complementary tapered bore at the apex portion of the cutter.

I claim:

1. A roller cutter and spindle assembly for earth boring drills comprising a spindle support and an integral main spindle section projecting therefrom, said main spindle section near its junction with the support having a curved outward reduction providing a portion of a ball raceway, said main spindle section projecting beyond said ball raceway portion and providing a free end for mounting a terminal spindle section, a terminal spindle section of a cap shape removably secured upon said free end and providing a portion of a ball raceway supplementary to said ball raceway portion on the main spindle section, the raceway portion of the terminal section facing the raceway portion on the main section and thereby forming an outer side wall of the raceway, the exterior of said terminal section providing friction bearing surfaces at an angle to each other, a cutter enclosing said spindle sections and having a recessed raceway portion complementary to the raceway portions of said sections, ball bearings in said raceway taking radial and end thrusts toward the support and also rotatably locking the cutter on the spindle, and said cutter having friction bearing surfaces contacting the friction bearing surfaces on the terminal spindle section.

2. An assembly according to claim 1 in which said terminal spindle section has a tapered screw threaded engagement upon the exterior of the free end of the main spindle section.

3. An assembly according to claim 1 in which said friction bearing surfaces upon the terminal spindle section includes a tapered surface at the outer end and a cylindrical surface inwardly therefrom, said surfaces intersecting each other.

4. In combination in an earth boring drill, a spindle integral with its support and having a rolling bearing raceway thereon rolling bearings on said raceway and a cap surrounding a free end of said spindle, said cap having spaced annular frictional bearing surfaces and a frusto conical cutter enclosing cap and spindle and engaging said frictional bearing surfaces and rolling bearings.

5. A roller cutter unit for an earth boring drill comprising a spindle support, a spindle projecting at right angles therefrom, said spindle comprising a portion of large diameter integral with the support and a portion of reduced diameter projecting from the first mentioned portion and having a free end, a cutter enclosing said spindle, said cutter having rows of teeth in a frusto-conical zone and having rows of teeth in another zone tapered with respect to said frusto-conical zone, a plurality of bearing means between the cutter and spindle and adapted to support the cutter without direct contact between the interior surface of the cutter and the peripheral surfaces of the spindle portions, said bearing means comprising rolling bearings between the cutter and the large diameter portion of the spindle and comprising a bearing sleeve surrounding and fitting the spindle portion of reduced diameter, said bearing sleeve being surrounded by said frusto-conical zone and the rolling bearings being surrounded by said tapered zone, whereby said bearing means cooperate to sustain radial thrusts from both cutter zones.

6. A roller cutter unit according to claim 5 in which the cutter is rotatable with respect to the bearing sleeve.

7. A roller cutter arrangement in an earth boring drill comprising a spindle support, a spindle portion integral therewith and projecting at right angles therefrom, said spindle portion providing a raceway for ball bearings, another spindle portion of reduced diameter projecting from the first-mentioned spindle portion and having a free end, a cutter enclosing said spindle portions, a plurality of bearing means between the cutter and spindle portions, one of which comprises balls mounted in said raceway and cooperating with a groove in the cutter to lock the cutter rotatively to the spindle portion of larger diameter, and another of which comprises a bearing sleeve surrounding and fitting the spindle portion of reduced diameter, said bearing means cooperating to space the cutter normally out of direct contact with the peripheral surfaces of both spindle portions, the open end of the cutter having clearance preventing contact between the cutter and the spindle support.

CLARENCE E. REED.